United States Patent Office 2,880,095
Patented Mar. 31, 1959

2,880,095

AQUEOUS ANTIRUST COMPOSITIONS

Allen E. Brehm, Griffith, Ind., and Albert W. Lindert, Homewood, Ill., assignors to Standard Oil Company, Chicago, Ill., a corporation of Indiana No Drawing. Application August 23, 1955
Serial No. 530,197

8 Claims. (Cl. 106—14)

Our invention relates to compositions for preventing rust corrosion of metal surfaces exposed to an aqueous phase. It provides rust preventative concentrates of special value in doping water used in metal machining operations, cooling towers, radiators, and the like, and includes the aqueous antirust compositions in diluted form.

In metal machining operations such as grinding, cutting, stamping and rolling, water or aqueous base compositions are widely used as coolants and cutting fluids. It is of course highly desirable that such aqueous fluids contain a material capable of adhering to the metal and acting as an antirust. A number of materials have been proposed for this purpose, including various water soluble amines and salts, e.g. sodium nitrite. The difficulty with these materials is that in general, they must be used in high concentrations, i.e. 1% or more, for effective protection. We have found that certain imidazoline salts of polymerized polycarboxylic acids have special value as antirust ingredients in aqueous compositions provided they are properly solubilized. The imidazoline salts are almost completely insoluble in water, but we have found that they may be solubilized in a manner and to an extent permitting handling in the form of stable concentrates and, after dilution, at concentration levels providing excellent protection.

The imidazoline salts of the invention have been described in pending application S.N. 525,389 of Jack A. Williams and are believed to be characterized by the following structural formula:

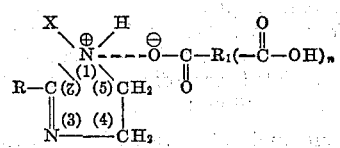

In the formula, R represents a hydrocarbon, essentially straight chain radical, of 10 to 30 carbon atoms in length. It may be a saturated or alkyl radical, or it may contain unsaturated bonds. It also may contain methyl branching of the type associated with the lower, normally liquid polymers of olefins such as propylenes and butylenes, or it may contain a ring structure such as a phenylene radical provided the essentially straight chain character of the chain is not destroyed. In the formula, X represents a hydroxyalkyl, aminoalkyl or an aminoalkylene iminoalkyl radical, preferably containing two to not more than about six carbon atoms in the chain. $R_1$ represents the residue of a higher polycarboxylic organic acid, preferably a polymerized fatty or synthetic acid and contains from about 15 to 60 carbon atoms, preferably 30 to 50 carbon atoms. $R_1$ may be derived from an acid containing at least 2 to 4 carboxyl groups so that n is an integer equal to 1–3 but preferably 2. The acid may contain unsaturated linkages and, in its most preferred form, contains one or more cyclic groups which apparently assist orientation of the polar groups in a common plane. The above formula symbolizes the probable structure and indicates the desired composition of the new inhibitors but it will be apparent that the structure can contain other essentially non-functional substituents which do not interfere with the antirust effectiveness of the structure.

The configuration indicated in the above formula is believed to be the most probable for the salts providing the rust inhibiting properties of the invention. The salts are nuclear salts of a nitrogen of the imidazoline nucleus. As indicated, the nitrogen in the number-1 position, to the best of our present knowledge, is the nitrogen participating in salt formation since it is more basic in nature than the nitrogen in the number-3 position, and this has been confirmed by analytical studies.

The 1-2-disubstituted imidazolines used in the invention are of a type well known in the art. See for example, U.S. Patent 2,214,152 to Wilkes. It is essential, however, that the 1-substituent include a polar group such as a hydroxy or an amino radical. Apparently, the polar sidechain contributes to the film forming capacity of the molecule but preferably it should not be over about 6 carbon atoms in length. The sidechain however may contain more than one polar grouping; for example, radicals derived from ethylene diamine, propylene diamine, diethylene triamine are suitable. Examples of useful imidazolines include 1-hydroxyethyl 2-heptadecenyl imidazoline, 1-aminoethyl 2-undecyl imidazoline, 1-hydroxyethyl 2-pentadecyl imidazoline, 1-aminoethyl 2-heptadecenyl imidazoline, 1-aminoethyl 2-heptadecyl imidazoline, 1-hydroxyethyl 2-heptadecyl imidazoline, 1-aminoethyl-ethyl imino 2-heptadecenyl imidazoline, and the like.

Polymerized carboxylic acids such as dilinoleic and trilinoleic acids have particular value as the acidic component of the additive combination. Although the imidazolines form salts readily with a wide variety of acids, the presence of more than one free carboxyl group in the acidic component appears to be quit critical for the purposes of the invention. Thus, the polycarboxylic acid must provide at least one and preferably two free carboxylic acid groups for a high degree of effectiveness. Although both dicarboxylic and tricarboxylic acids give excellent protection against rusting in the water phase, it appears that the tricarboxylic acids approach the optimum in this respect. The use of mixtures of polycarboxylic acids such as may be derived by polymerization of unsaturated mono-acids, rather than pure acids reduces cost and appears to be advantageous in terms of function as well.

A useful, commercially available dimeric carboxylic acid is commercially available from Emery Industries Inc. under the tradename Emery 955-Dimer Acid. Since the commercial product is produced by dimerization of linoleic acid, it is usually referred to as dilinoleic acid. The commercial acid typically contains about 85% of dilinoleic acid, about 12% trilinoleic acid and about 3% of monomeric acid. The dimeric acid has the following structural formula:

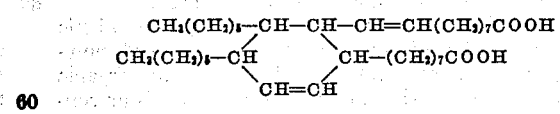

Typical specifications for the commercial product are as follows:

| | |
|---|---|
| Iodine value | 80–95 |
| Acid value | 180–192 |
| Saponification value | 185–195 |
| Unsaponifiable | 2.0% max. |
| Color, Gardner | 12 max. |
| Neutralization equivalent | 290–310 |
| Refractive index at 25° C. | 1.4919 |
| Specific gravity at 15.5° C./15.5° C. | 0.95 |
| Flash point, °F. | 530 |

Fire point, °F. _____ 600
Viscosity at 25° C. (Gardner-Holdt) _____ Z4
Viscosity at 25° C., centistokes _____ 10,000
Viscosity at 100° C., centistokes _____ 100

The most satisfactory acid for use in forming the new inhibitors, measured in terms of antirust effectiveness, is a mixture of polymerized fatty acids predominating in trilinoleic acid. A particularly satisfactory acid is commercially available from the W. C. Hardesty Company under the tradename of D-50 Acid. A similar product is marketed by Rohm & Haas Company under the tradename VR-1 Acids. Such acids may be produced as by-product still-residues in the manufacture of sebacic acid by the distillation of castor oil in the presence of caustic. A method of obtaining such by-product still-residues in the preparation of sebacic acid is described in U.S. 2,470,849 issued to W. E. Hanson May 24, 1949. The mixture of high molecular weight unsaturated fatty acids comprises monomers, dimers, trimers and higher polymers in the ratio of from about 45% to about 55% of a monomers and dimers fraction having a molecular weight in the range of from about 300 to 600, and from about 45% to about 55% of a trimers and higher polymer fraction having a molecular weight in excess of 600. The fatty acid polymers result in part from a thermal polymerization of fatty acid type constituents of the castor oil, and in part from other reactions, such as the inter-molecular esterification, of such acid to form high molecular weight products. The acid mixture, which is mainly a mixture of polymeric long chain polybasic carboxylic acids, is further characterized by the following specifications:

Acid No.—150 to 164
Saponification No.—175 to 186
Free fatty acids—75 to 82%
Iodine value—44 to 55

The trimeric acid which is the major constituent of the above described acids and which is believed to be responsible for the superior properties thereof has the following formula:

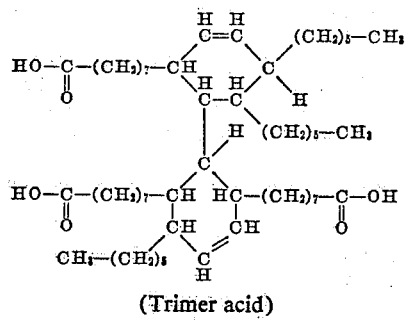

(Trimer acid)

Although the above are examples of commercially available mixed polycarboxylic acids, other polycarboxylic acids derived by polymerization of unsaturated acids, and corresponding oil soluble polycarboxylic acid type materials, e.g. lecithin, also may be used.

For example, various naturally occurring or synthetic acids may be linked together to provide useful polycarboxylic acids by means well known to organic chemists, e.g. polymerization of unsaturated acids or condensation of alpha-halogenated acids, to produce polymeric forms of readily available carboxylic acids such as lauric, stearic, oleic, linoleic, oxo acids (e.g. isooctyl acids), synthol acids and the like. The point of linkage should be such that several carboxylic groups may be oriented in a common plane at one end of the molecule in film formation on a metal surface or at a water interface, leaving an essentially chain-like hydrocarbon portion susceptible of close molecular packing free to extend into the oil phase. α-Distearic acid is an illustration.

Aqueous solutions of the imidazoline salts can be obtained in several ways. The salts can be added to water containing enough of a basic substance such as sodium hydroxide to form a sodium salt of the imidazoline salt of the polycarboxylic acid. We have also found that the use of an organic base such as triethanolamine in combination with a water soluble solvent such as isopropyl alcohol effectively solubilizes the imidazoline salt. These methods, however, although effective, appear to impair somewhat the antirust activity of the imidazoline salt. Superior results are obtained by mixing the imidazoline salt with a soap having some degree of both water and oil solubility and adding a small amount of a water soluble oxygenated organic solvent such as a lower alcohol. The resulting mixture forms stable aqueous concentrates of up to about 10% strength from which the imidazoline is not precipitated upon dilution to the use concentration level.

The use of a sulfonate such as sodium mahogany sulfonate in combination with isopropyl alcohol has been found to be particularly effective. The soap used may be the purified 100% material or oil concentrates thereof, e.g. a 50% concentrate of purified sodium mahogany sulfonate in oil. Other soaps of value include ammonium mahogany sulfonate, ammonium and sodium salts of various alkyl aryl sulfonates, sodium naphthenate, and the like. The useful oxygenated solvents include the water soluble lower alcohols, ketones, aldehydes, esters and the like.

We have also found that the addition of a minute amount of a weak organic acid, e.g. benzoic acid, enhances the rust preventative properties of the aqueous solution. This may result from counteracting the slightly alkaline nature of the water miscible soap rather than the nature of the acid since optimum protection seems to be associated with a slightly acid pH.

The new compositions are advantageously made up in the form of rust preventative concentrates which may comprise, for example, about 1 to 10 weight percent of the imidazoline salt of a polycarboxylic acid, about 0.1 to 10 weight percent of the water miscible organic soap, about 0.4 to 40 weight percent of the water soluble oxygenated solvent, and about 0.001 to 1 weight percent of the weak organic acid. The balance of the composition, about 39 to 99 weight percent, is water although other compatible materials may be added without interfering with the antirust function.

In use, the concentrates are advantageously diluted with water to obtain a final concentration of about 0.001, preferably from about 0.05 to 1 weight percent of the imidazoline salt. An example of a composition which has been formulated according to the invention and successfully tested follows:

1.0 wt. percent imidazoline salt of polymerized linoleic acid
1.0 wt. percent purified AA sodium mahogany sulfonate
0.01 wt. percent benzoic acid
4.0 wt. percent isopropyl alcohol
93.9 wt. percent water Aqueous antirust compositions may be tested by allowing soft iron test strips to stand in the aqueous solution under test for specified periods. A more severe test, however, is to contact the soft iron test strips with the test solutions for a specified period, e.g. 1 hour, and then place these strips in a static atmosphere of 100% humidity. Under these conditions, a strip exposed to water containing 0.05 weight percent of the salt of 2-heptadecenyl-1-hydroxyethyl imidazoline and polymerized acid for one hour, and then subjected to the 100% humidity conditions, showed no rust for more than 48 hours.

A special advantage of the aqueous antirust compositions of the invention is that in sharp contrast to almost all of the current commercial rust preventative compositions they possess valuable lubricating properties. The use of rust preventative concentrates lacking in lubricating properties is objectionable to many metal fabricators because the aqueous solutions of the concentrates wash lubricants out of bearings and promote excess wear. The new compositions are unusual in possessing exceptional load carrying properties even when diluted with large volumes of water. For example, the following results were obtained in testing the above illustrated formulation on the Almen machine:

|   | Almen Test Load | |
|---|---|---|
|   | Pass | Fail |
| 1. Formulation undiluted | 30+ lbs.[1] | |
| 2. One part of (1) diluted with 30 parts water | 12 | 14 |
|   | 14 | 16 |
| 3. Petroleum oil (150 SSU at 100°F.) | 4 | 6 |

[1] Load limit of the Almen machine.

The above data demonstrate that formulations typical of the new compositions withstand over 3 times the bearing pressures that can be carried by ordinary petroleum oil.

We claim:

1. An aqueous antirust composition consisting essentially of water containing an amount in the range of about 0.001 to 10 weight percent sufficient to impart antirust properties thereto of a normally water insoluble imidazoline salt of a polycarboxylic acid corresponding to the following structural formula:

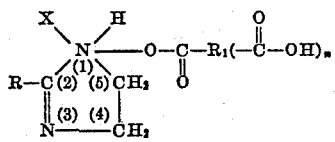

in which R is a hydrocarbon radical of 10 to 30 carbon atoms in length, X is a substituted alkyl group containing from 2 to about 6 carbon atoms selected from the class consisting of hydroxyalkyl, aminoalkyl and aminoalkylene iminoalkyl radicals, $R_1$ is a hydrocarbon grouping derived from a higher polycarboxylic acid containing from about 15 to 60 carbon atoms and $n$ is an integer in the range of 1 to 3 inclusive, in which said imidazoline salt has been solubilized by the addition of a water miscible organic soap selected from the class consisting of sodium and ammonium sulfonates and sodium naphthenate in combination with a water soluble oxygenated organic solvent.

2. The composition of claim 1 in which the acid component of the imidazoline salt is polymerized linoleic acid.

3. The composition of claim 1 in which the imidazoline salt is a 2-heptadecenyl-1-hydroxyethyl imidazoline salt of polymerized linoleic acid.

4. The composition of claim 1 in which the soap is sodium mahogany sulfonate.

5. The composition of claim 1 in which the solvent is a lower alcohol.

6. The composition of claim 1 which contains a small amount of a weak organic acid.

7. The composition of claim 6 in which the acid is benzoic acid.

8. An aqueous antirust composition which essentially comprises a water solution of about 1 to 10 weight percent of a 2-alkyl-1-hydroxyalkyl imidazoline salt of polymerized linoleic acid which has been solubilized by the combination of about 0.1 to 10 weight percent of sodium mahogany sulfonate and about 0.4 to 40 weight percent of isopropyl alcohol and which contains about 0.001 to 1 weight percent of benzoic acid.

References Cited in the file of this patent

UNITED STATES PATENTS

| 2,324,577 | Haffner et al. | July 20, 1943 |
| 2,466,517 | Blair et al. | Apr. 5, 1949 |
| 2,610,151 | Putman et al. | Sept. 9, 1952 |
| 2,631,979 | McDermott | Mar. 17, 1953 |
| 2,708,660 | Jolly | May 17, 1955 |
| 2,718,503 | Rocchini | Sept. 20, 1955 |